United States Patent
Sandhage et al.

(10) Patent No.: US 6,407,022 B1
(45) Date of Patent: Jun. 18, 2002

(54) METHOD FOR FABRICATING SHAPED MONOLITHIC CERAMICS

(75) Inventors: Kenneth H. Sandhage, Upper Arlington, OH (US); Pragati Kumar, Hamburg (DE)

(73) Assignee: The Ohio State University Research Foundation, Columbus, OH (US)

( * ) Notice: Subject to any disclaimer, the term of this patent is extended or adjusted under 35 U.S.C. 154(b) by 0 days.

(21) Appl. No.: 09/296,138

(22) Filed: Apr. 21, 1999

Related U.S. Application Data (60) Provisional application No. 60/083,534, filed on Apr. 29, 1998.

(51) Int. Cl.[7] .............................................. C04B 38/00
(52) U.S. Cl. ...................................... 501/80; 428/307.7
(58) Field of Search ................................ 264/642, 643, 264/681; 252/184; 428/307.7; 501/96.1, 108, 118, 123, 126, 127, 135

(56) References Cited

U.S. PATENT DOCUMENTS

| | | | |
|---|---|---|---|
| 4,626,616 A | 12/1986 | Morelock | 501/92 |
| 4,879,262 A | 11/1989 | Halverson et al. | 501/87 |
| 4,916,113 A | 4/1990 | Newkirk et al. | 501/89 |
| 4,988,645 A | 1/1991 | Holt et al. | 501/91 |
| 5,134,102 A | 7/1992 | Nadkarni et al. | 501/155 |
| 5,141,819 A | 8/1992 | Aghajanian et al. | 428/545 |

(List continued on next page.)

OTHER PUBLICATIONS

Ewsuk, et al., "Microstructure and Properties of Al2O3–Al(Si) and Al2O3Al(Si) Composites Formed by In Situ Reaction of Al with Aluminosilicate Ceramics", Metallurgical and Materials Transactions A, vol. 27A, (Aug., 1996), pp. 2122–2129.

Fahrenholtz, et al., "Formation of Structural Intermetallics by Reactive Metal Penetration of Ti and Ni Oxides and Aluminates,", Metallurgical and Materials Transactions A, vol. 22A, (1996), pp. 2100–2104.

(List continued on next page.)

Primary Examiner—Steven P. Griffin
Assistant Examiner—Edward M. Johnson
(74) Attorney, Agent, or Firm—Standley & Gilcrest LLP

(57) ABSTRACT

The process of the present invention comprises a method for fabricating shaped monolithic ceramics and ceramic composites through displacive compensation of porosity, and ceramics and composites made thereby. The method of the present invention includes three basic steps:

1) Synthesis or other acquisition of a porous preform: A porous preform with an appropriate composition, pore fraction, and overall shape is prepared or obtained. The pore fraction of the preform is tailored so that the reaction-induced increase in solid volume can compensate partially or completely for such porosity. It will be understood that the porous preform need only be sufficiently dimensionally stable to resist the capillary action of the infiltrated liquid reactant;

2) Infiltration: The porous preform is infiltrated with a liquid reactant; and

3) Reaction: The liquid reactant is allowed to react partially or completely with the solid preform to produce a dense, shaped body containing desired ceramic phase(s).

The reaction in step 3) above is a displacement reaction of the following general type between a liquid species, M(l), and a solid preform comprising the compound, $N_B X_C(s)$:

$$AM(l) + N_B X_C(s) = AMX_{C/A}(s) + BN(l/g) \quad (2)$$

where $MX_{C/A}(s)$ is a solid reaction product (X is a metalloid element, such as, for example, oxygen, nitrogen, sulfur, etc.) and $N(l/g)$ is a fluid (liquid or gas) reaction product. A, B and C are molar coefficients.

26 Claims, 1 Drawing Sheet

U.S. PATENT DOCUMENTS

| | | |
|---|---|---|
| 5,214,011 A | 5/1993 | Breslin ........................ 501/127 |
| 5,215,666 A | 6/1993 | Kuszyk et al. ............... 222/591 |
| 5,238,883 A | 8/1993 | Newkirk et al. ............... 501/87 |
| 5,254,511 A | 10/1993 | Nadkarni et al. ............ 501/155 |
| 5,298,051 A | 3/1994 | Claar et al. ..................... 75/238 |
| 5,334,562 A | 8/1994 | Newkirk et al. ............... 501/88 |
| 5,358,914 A | 10/1994 | Newkirk et al. ............. 501/127 |
| 5,420,085 A | 5/1995 | Newkirk et al. ............... 501/98 |
| 5,434,113 A | 7/1995 | Kuszyk et al. ............... 501/127 |
| 5,436,209 A | 7/1995 | Newkirk et al. ............. 501/127 |
| 5,585,313 A | 12/1996 | Shobu et al. .................. 501/89 |
| 5,654,246 A | 8/1997 | Newkirk et al. ............... 501/80 |
| 5,728,638 A | 3/1998 | Strange et al. ............... 501/127 |

OTHER PUBLICATIONS

Breslin, et al., "Processing, Microstructure, and Properties of Co–Continuous Alumina–Aluminum Composites", Materials Science & Engineering A195, (1995), pp. 113–119.

Breslin, et al., "Applications of Co–Continuous Ceramic Composite Materials for Automotive Components", SAE Technical Paper Series 930184, (Mar. 1–5, 1993).

Breslin, et al., Co–Continuous Alumina–Aluminum Composites for Heat Sinks and Substrates, (1991).

Liu, et al., "Microstructures and Properties of Interpenetrating Alumina–Aluminium Composites Made by Reaction of $SiO_2$ Glass Preforms with Molten Aluminium", Materials Science & Engineering A210, (1996), pp. 1–7.

Loehman, et al., Synthesis of $Al_2O_3$–Al Composites by Reactive Metal Penetration, J. Am. Ceram. Soc., 79[1], (1996), pp. 27–32.

Saiz, et al., "Effects of Composition and Atmosphere on Reactive Metal Penetration of Aluminium in Mullite", Journal of European Ceramic Society 16, (1996) pp. 275–280.

Hanabe, et al., $Al_2O_3$/Al Particle–Reinforced Aluminum Matrix Composite by Displacement Reaction, Materials Research Society, vol. 11, No. 6, pp. 1562–1569. (1996).

I. PREPARATION OF POROUS, OXIDE + METAL PREFORM

BINDER BURNOUT, PARTIAL SINTERING

II. INFILTRATION OF POROUS PREFORM

III. DISPLACEMENT REACTION AND METAL ALLOYING

US 6,407,022 B1

METHOD FOR FABRICATING SHAPED MONOLITHIC CERAMICS

This application claims the benefit of U.S. Provisional Application No. 60/083,534, filed Apr. 29, 1998, incorporated herein by reference.

BACKGROUND

Refractory ceramics (e.g., aluminates, aluminosilicates) can exhibit several enhanced properties relative to refractory metals and alloys, such as corrosion resistance, high temperature stability in oxidizing atmospheres, specific strength and stiffness, creep resistance, and wear resistance. However, the brittleness of ceramic bodies renders the fabrication of shaped components tedious and expensive. Such brittleness also necessitates the use of reinforcements to enhance damage tolerance.

Despite extensive research and development over the past few decades, continuous-ceramic-fiber-reinforced, ceramic-matrix composites have not found widespread use in high-temperature structural applications involving oxidizing atmospheres (e.g., turbine engine applications). The use of these materials has been hampered by the inability to produce low-cost, net-shaped composites that are capable of retaining both a high strength (i.e., owing to a high fiber strength) and a high toughness (i.e., owing to sufficiently weak fiber-matrix interface for fiber-pullout toughening) under such high-temperature, oxidizing conditions (e.g., ≈1200° C. in high-pressure air for turbine engine applications) [1–7]. Erosion/oxidation resistance are of particular concern in the very high-temperature (≈2000° C.) corrosive conditions of liquid-fueled rocket engines [7]. Although continued research and development of high-strength oxide fibers and oxidation-resistant interface coatings may ultimately enable the low-cost fabrication of oxide fiber-reinforced ceramic composites with satisfactory damage tolerance and erosion/oxidation resistance for jet and rocket engine applications, oxide-matrix composites with other types of reinforcements should be considered in the interim.

An alternate approach for reinforcing oxide matrices is to use metallic (or intermetallic) alloys that are oxidation resistant, such as Ni-based compositions, or very high-melting, such as Nb-based compositions (Nb, Nb—Al solid solutions, and $Nb_3Al$ melt at 2468° C., 2060–2468° C., and 1940–2060° C., respectively [8,9]). As reinforcement materials, Ni-rich or Nb-rich solid solutions, intermetallic compounds, or mixtures thereof offer a number of attractive features.

For example, owing to their oxidation resistance at elevated temperatures, damage tolerance (e.g., yield strength, ultimate tensile strength, toughness, fatigue resistance) over a range of temperatures, and capability for being fabricated into complex shapes (e.g., by casting), Ni-based superalloys are used extensively for high-temperature components in engine applications (e.g., combustor liners and ducts, disks and blades, and nozzle vanes in turbine engines; exhaust valves in reciprocating engines; pre-combustion chambers in diesel engines) [5–7,10–13]. Aluminum additions are used to enhance the high-temperature strength of such superalloys, owing to the formation of the ordered compound $\gamma'$-$Ni_3Al$ as a coherent precipitate dispersed within the Ni-rich (FCC $\gamma$ phase) solid solution matrix [1,5,11,14–19]. Pure $\gamma'$-$Ni_3Al$ and its alloys exhibit higher yield strengths at elevated temperatures than the $\gamma$ phase [11,14–19]. The $\gamma'$ compound can also act as a ductile reinforcement material in composites (at room temperature or elevated temperatures), either as a polycrystalline material with proper alloying (e.g., Al concentration <25 atom percent(at%) with dopants such as boron and chromium) or in single crystal form (e.g., as single crystal filaments) [11,14–18]. Stoichiometric $\beta$-NiAl, while less ductile at room temperature than Ni-based superalloys and $\gamma'$-$Ni_3Al$ alloys, possesses a higher elastic modulus, a higher thermal conductivity, and a higher melting point (1638° C.) [15,19–23]. Niobium alloys and internetallic compounds (e.g., $Nb_3Al$) are very high melting and exhibit better creep resistance than $Ni_3Al$, possess high thermal conductivities at elevated temperatures, and are less dense than other refractory metals (such as W, Ta, Mo) [8,24–26].

As indicated by the discussion above, these Ni-bearing and Nb-bearing alloys offer a tailorable range of thermomechanical properties that can be exploited in ceramic composites. In addition, the negative features of these alloys (i.e., weight, creep) can be significantly reduced if such alloys are used as reinforcements within composites containing a stiff, continuous, light-weight ceramic phase.

Accordingly, there remains a need for a method for the fabrication of near net-shaped $AEAl_2O_4$-bearing (where AE=Mg, Ba) composites reinforced with M-Al (M=Ni, Nb) solid solutions and/or intermetallic compounds (e.g., Nb, NiAl+$Ni_3Al$, or $Ni_3Al$+Ni-based solid solutions) [27].

Because the ionic species in these aluminates have essentially fixed valence states, these oxide compounds are thermodynamically compatible with oxygen at high temperatures. On the other hand, Nb, Ni, (Nb,Al) or (Ni,Al) solid solutions, and $\gamma'$-$Ni_3Al$ can act as ductile reinforcements at ambient and elevated temperatures ($\beta$-NiAl also becomes ductile above ~400° C.) [15,17,19,23]. The thermal conductivities of Nb, Ni, and Ni—Al alloys (particularly $\beta$-NiAl) are much higher than for the aluminates [25]. The coefficients of thermal expansion (CTE) of the aluminates are smaller than for nickel or the nickel aluminides, which should place the ceramic phase in compression upon cooling from the peak processing or use temperature [9,32]. For very high-temperature applications, composites of AE aluminate and Nb or $Nb_3Al$ are attractive in that these phases possess similar CTE values ($8.2$–$9.2 \times 10^{-6}/°C$. [9,32]).

Although the properties of $AEAl_2O_4$/M—Al alloy composites will depend on factors such as the amounts, sizes, and distributions of phases, and the degree of interfacial bonding, the discussion above (and in the following sections) indicates that such composites can be:

lighter and more resistant to high-temperature creep, oxidation, and erosion relative to monolithic metallic alloys or intermetallics, more fracture resistant (tougher, higher fracture strengths) and thermally conductive than monolithic aluminates, formed into near net shapes by the process of the present invention as described herein.

Accordingly, and with the foregoing objectives and advantages in mind, the present invention is summarized below. In view of the present disclosure or through practice of the present invention, other advantages may become apparent.

SUMMARY OF THE INVENTION

A variety of reaction-based techniques have been developed for the in-situ syntheses of monolithic ceramics and ceramic composites, including the Co-Continuous Ceramic Composite ($C^4$) process [1,2], the reactive metal penetration process (RMP) [3–5], the Directed Metal Oxidation (DIMOX) [6,7], the Reaction Bonded Metal Oxide (RBMO) process [8,9], Self-Propagating High-Temperature Syntheses (SHS) [10], Hillig or Hucke Process [11–13], and the Solid Metal-Bearing Precursor (SMP) process [14–18].

Such $AEAl_2O_4/M$—Al alloy composites should exhibit enhanced thermo-mechanical properties relative to monolithic $AEAl_2O_4$ or monolithic M—Al alloy bodies. Compared to Nb, Ni, and Ni—Al alloys, polycrystalline $MgAl_2O_4$ and $BaAl_2O_4$ possess higher values of elastic moduli, lower densities, and, hence, higher values of specific stiffness (e.g., $E/\rho$=79, 40, 24, 23, and 12 MPa·cm$^3$/g for $MgAl_2O_4$, NiAl, $Ni_3Al$, Ni, and Nb respectively, at room temperature) [11,15,22,23,28]. These stiff, stoichiometric aluminates exhibit better creep resistance at elevated temperatures than Nb, Ni, or Ni—Al—based solid solutions or intermetallic compounds [29–31].

The DCP process described in the present disclosure differs from several of these approaches, in that it does not rely upon oxidation reaction(s) involving externally-supplied, gaseous oxidants (e.g., the DIMOX, RBMO, SHS, and SMP processes involve oxidation reactions with externally-supplied $O_2(g)$). The fabrication of large parts by processes that involve the use of a fluid, external reactant (DIMOX, RBMO, SHS, SMP) can require relative long oxidation times, as the reactant must migrate inwards through the thickness of the precursor from the outside surfaces.

Since the reactions involved in the DCP process do not involve an externally-supplied gaseous reactant, the rate of conversion does not scale with the size of the starting preform. The DCP and Hillig/Hucke processes both involve the reaction of a porous, solid preform with a liquid that has been infiltrated into the preform. However, unlike the Hillig/Hucke process, the porous, solid preform in the DCP route undergoes a displacement reaction with the liquid phase. The $C^4$ and RMP processes also involve a displacement reaction between a fluid metallic phase and a solid oxidant. However, an important distinction between the DCP process and the $C^4$ and RMP methods is the difference in volume of the solid products and reactants. In the $C^4$ and RMP processes, a liquid metal reacts with a solid oxidant to produce a ceramic-metal composite, such as by the following net reaction:

$$4Al(l)+3SiO_2=2Al_2O_3+3(Si) \quad (1)$$

where (Si) refers to silicon dissolved in molten aluminum. The volume of 2 moles of alumina is less than the volume of 3 moles of silica. The open space formed as a result of this reduction in solid oxide volume is filled by molten metal (Al—Si alloy) that penetrates into the solid preform during reaction. Because the molten metal accommodates this change in volume, near net-shaped parts can be produced by the $C^4$ and RMP processes after solidification of the molten claim. However, due to the reaction-induced reduction in solid volume, the ceramic content of the final shaped part produced by the $C^4$ and RMP processes will be less than that of the preform. The reaction(s) involved in the DCP process result in an increase in solid volume, so that ceramic content of the final shaped part is greater than that of a porous preform. Hence, shaped parts containing relatively high fractions of ceramic phase can be produced by the DCP process.

In accordance with the present invention, the following general displacement reaction between a liquid species, M(l), and a solid preform comprising the compound, $N_BX_C$ (s):

$$AM(l)+N_BX_C(s)=AMX_{C/A}(s)+BN(l/g) \quad (2)$$

where $MX_{C/A}(s)$ is a solid reaction product (X is a metalloid element, such as, for example, oxygen, nitrogen, sulfur, etc.) and N(l/g) is a fluid (liquid or gas) reaction product. A, B and C are molar coefficients.

In the DCP process of the present invention, the reactants and reaction conditions are chosen such that the volume of "A" moles of the solid product, $MX_{C/A}(s)$, is greater than the volume of one mole of the solid reactant, $N_BX_C(s)$. If the $N_BX_C(S)$ preform is porous, then this reaction-induced volume increase can be accommodated by such porosity, so that the external dimensions of the final shaped, $MX_{C/A}(s)$-bearing part can be close to those of the porous preform. Reactions of the type (2) that involve an increase in solid volume are a key feature of the DCP process of the present invention. Such volume-increasing, liquid/solid displacement reactions have not been used to date to produce near net-shaped, dense ceramic bodies.

Accordingly, the methods of the present invention include a method for producing a material selected from the group consisting of ceramics and ceramic composites, the method comprising reacting: (1) a fluid comprising at least one displacing metal; and (2) a rigid, porous ionic material having a pore volume and comprising at least one ion (which for instance and preferably may be derived from a non-alkaline earth metal), the at least one displacing metal capable of displacing the ion(s); and allowing the fluid to infiltrate the ionic material or compound such that the at least one displacing metal at least partially replaces (and preferably substantially or completely replaces) ion(s), such as non-alkaline earth ion(s), and so as to at least partially fill (and preferably substantially or completely fill) the pore volume, and so as to produce a ceramic or ceramic composite. Whether the resultant material is a ceramic or ceramic composite will depend upon whether the displaced metal remains in the product material to form another phase. If so, the resultant product will be a composite; if not, the resultant product will be a ceramic, only containing a ceramic phase.

As used herein, "oxidation" refers to the process by which metal elements are converted to a higher valence state (i.e., metal cations), and "reduction" refers to the process by which metal cations are converted to a lower valence state (i.e., metal elements). A "displacement reaction" shall refer to a process in which at least one first displacing metal cation undergoes reduction as a result of a reaction with at least one second metal element whichundergoes oxidation. For the purposes of this specification, the alkaline earth metals are berylium, magnesium, calcium, strontium, barium and radium.

The displacing metal(s) may be any metal(s) adapted to replace the ion(s) of the ionic material or compound, and for instance may comprise alkaline earth metal(s) which, for instance, may be selected from the group consisting of magnesium, calcium, strontium, barium and mixtures thereof. For instance, the displacing metal(s) may be selected from the group consisting of non-alkaline earth ions, such as ions derived from metals such as aluminum, nickel and niobium.

The rigid, porous ionic material(s) may comprise any ionic material or compound(s) adapted to contain the ions to be displaced, such as ions derived from non-alkaline earth metal(s), for instance those materials that may be selected from the group consisting of oxides, sulfides, nitrides and halides. The rigid, porous ionic material(s) also may comprise ionic materials or compounds selected from the group consisting of aluminates, aluminosilicates, silicates, titanates, zirconates, and niobates. The non-alkaline earth metal(s), for instance, may be selected from the group consisting of aluminum, nickel, niobium.

To make a net shaped article by the method of the present invention, the rigid, porous ionic material is preformed into a shape, and, following the process of the present invention, the ceramic or ceramic composite maintains that shape, typically within a few percent of the original shape. This preforming may be done by a light sintering, for instance.

In a preferred embodiment, the fluid is a liquid, the liquid being supplied by a melting solid comprising the displacing metal(s), such one or more alkaline earth metals. It is preferred that the two solid reactive components (1) and (2) be placed in contact while in a solid state for ease of handling, then allowing the melting solid (i.e., a solid that would become melted at or before reaching the processing temperature) to melt so as to bring the liquid phase into contact with the rigid, porous ionic material. The same may also be accomplished by using a solid material that may sublime to produce such a fluid as reactant component (1) above.

The method of the present invention may also be described as a method for producing a ceramic or ceramic composite, the method comprising reacting: (1) a fluid comprising at least one displacing metal; and (2) a rigid, porous ionic material having a pore volume and comprising at least one ion, such as a non-alkaline earth ion, the at least one displacing metal capable of displacing the at least one ion; and allowing the fluid to infiltrate the ionic material such that the at least one displacing metal at least partially replaces (and preferably substantially and even completely replaces) the at least one non-alkaline earth ion, and so as to at least partially fill (and preferably substantially and even completely fill) the pore volume and so as to undergo a general displacement reaction between reactants comprising a liquid species $M(l)$ derived from the fluid, and the rigid, porous ionic material of the general formula, $N_B X_C(s)$, as follows:

$$AM(l) + N_B X_C(s) = AMX_{C/A}(s) + BN(l/g)$$

wherein $MX_{C/A}(s)$ is a solid reaction product and wherein X is a metalloid (i.e., a metal or metalloid element), $N(l/g)$ is a fluid reaction product, and A, B and C are molar coefficients; and wherein the reactants are chosen such that the volume of A moles of the solid reaction product $MX_{C/A}(s)$ is greater than the volume of one mole of the solid reactant, $N_B X_C(s)$, such that the reaction-induced volume increase can be accommodated by such pore volume, and so as to produce a material selected from the group consisting of ceramics and ceramic composites.

The displacing metal(s), ion(s), and rigid, porous ionic material(s), as well as other preferred aspects of the method of the present invention, may be as described and exemplified above.

The method of the present invention may also be described as a method for producing a ceramic or ceramic composite, the method comprising the steps: (a) placing in contact:
(1) a solid adapted to produce a fluid material comprising at least one displacing metal;
(2) a rigid, porous ionic material having a pore volume and comprising at least one ion, such as those derived from non-alkaline earth metal(s), maintaining the solid at sufficient temperature such that the solid produces the fluid, the fluid infiltrating the ionic material so as to at least partially replace (and preferably substantially and even completely replace) the ion(s), and so as to at least partially fill (and preferably substantially and even completely fill) the pore volume, and so as to produce a material selected from the group consisting of ceramics and ceramic composites.

The displacing metal(s), ion(s), and rigid, porous ionic material(s), as well as other preferred aspects of the method of the present invention, may be as described and exemplified above.

The present invention includes any ceramic or ceramic composite prepared in accordance with the inventive methods described herein.

The DCP process of the present invention comprises three basic steps:

1) Synthesis or other acquisition of a porous preform: A porous preform with an appropriate composition, pore fraction, and overall shape is prepared or obtained. The pore fraction of the preform is tailored so that the reaction-induced increase in solid volume can compensate partially or completely for such porosity. It will be understood that the porous preform need only be sufficiently dimensionally stable to resist the capillary action of the infiltrated liquid reactant.

2) Infiltration: The porous preform is infiltrated with a fluid (liquid or gas) reactant (which, if liquid, may come from the melting of a solid or otherwise from a substance introduced to the reaction in liquid form.

3) Reaction: The fluid reactant is allowed to react partially or completely with the solid preform to produce a dense, shaped body containing desired ceramic phase (s).

As the DCP process of the present invention involves the reaction of liquid and solid phases throughout the infiltrated preform, the time required to form the desired ceramic phase(s) should depend on interfacial areas and/or the sizes of the reacting phases, and should not depend on the overall dimensions of the preform. As a result, the reaction time required for large parts can be relatively modest. By properly tailoring the pore fraction and composition of the preform, the shape and dimensions of the final transformed part can be close to those of the porous preform. Hence, costly ceramic machining of the final part can be minimized or avoided. Further, since porous ceramic preforms of desired shape can be produced by relatively low cost processes (e.g., slip casting, cold pressing), the DCP process is an inexpensive means of fabricating dense and shaped ceramic-bearing bodies.

By tailoring the composition of the liquid and the preform, the DCP process can be used to fabricate near net-shaped composites with a wide range of ceramic and metal contents. For example, the present invention may be used to synthesize co-continuous composites of refractory, alkaline-earth aluminates with high-melting metallic or intermetallic reinforcements (e.g., $MgAl_2O_4/Nb$, $BaAl_2O_4/Ni_3Al+NiAl$ composites). Such $AEAl_2O_4/M$—Al composites should exhibit enhanced stiffness/creep resistance, improved erosion/oxidation resistance, and lower densities ($\rho_{MgAl_2O_4} < 0.5 \rho_{Ni}$ or $0.5 \rho_{Nb}$) than pure metals or intermetallics. These composites should also possess higher values of fracture strength, toughness, and thermal conductivity than monolithic aluminates.

The method of the present invention may thus be carried out by the fabrication of a shaped, porous preform of solid oxide+metallic (or intermetallic) reactants, followed by the (preferably) pressureless infiltration of the preform with a low-melting, alkaline-earth-bearing liquid, followed by, or accompanied by, heat treatment to allow for an internal displacement reaction that converts the liquid/solid mixture into a dense, near net-shaped, high-melting ceramic/metal alloy composite.

The present invention also includes the ceramic/metal alloy composites prepared by the method of the present invention.

The present invention may be understood by reference to the processing/microstructure/property correlations for DCP-derived, AEAl$_2$O$_4$/M—Al alloy composites (AE=Mg or Ba; M=Ni or Nb; M—Al=metallic alloy and/or intermetallic compound) described herein. In accordance with the present invention, one skilled in the art may make additional adjustments to the processing parameters to affect the macrostructure (shape, dimensional retention) and microstructure (phase fraction, size, chemistry; interface chemistry/morphology) of composites of the present invention.

The microstructural features of ceramic composites of the present invention are believed to improve mechanical properties (e.g., MOR, toughness/damage tolerance, and creep). Through the present invention, one may tailor the microstructure of ceramic composites without compromising the shape retention capability.

AEAl$_2$O$_4$/M—Al alloy composites of the present invention may be fabricated by infiltrating AE-bearing liquids into porous, oxide+metal preforms, and then conducting a displacement reaction of the following type:

where AE is one or more alkaline earth metal, preferably Mg or Ba or Ca; M is a non-alkaline earth metal, such as Ni or Nb; bracketing "{ }" refers to species dissolved in a liquid; M$_y$Al$_z$(s), M$_{1+x+y}$Al$_{w+z}$ refer to solid solutions, compounds, or mixtures of both. Such composites may include, for example, i) MgAl$_2$O$_4$ or BaAl$_2$O$_4$ as the matrix phase, and ii) Nb or Ni—Al metallic solid solutions and/or intermetallic compounds (e.g., Ni$_3$Al, NiAl) as the reinforcement phase (s).

Dense, shaped, aluminate-matrix composites with varied amounts of M—Al reinforcements may be produced by tailoring the composition of the liquid (AE, w, and x), and the pore fraction (P) and phase content (M, y, and z) of the preform. For example, a composite of 90.5 vol % BaAl$_2$O$_4$ and 9.5 vol % Ni$_{0.94}$Al$_{0.06}$ solid solution can be produced if w=0.06, x=y=z–0, and P=0.43. However, if w=0.95, y=6.00, x=z=0, and P=0.32, then a composite of 54 vol % BaAl$_2$O$_4$ and 46 vol % Ni$_{0.88}$Al$_{0.12}$ solid solution can be synthesized.

Ceramic and reinforcement phase sizes in the transformed composites may be adjusted by varying the sizes of pores and reactant phases in the preform (i.e., by controlling particle sizes/distributions and compaction/sintering conditions).

Dopants optionally may be introduced into the liquid or the preform to alter the interface chemistry and morphology in the reacted composites.

By altering mechanical behavior through changes in microstructure/microchemistry, and tailoring the flexible DCP process of the present invention to obtain particular microstructural/microchemical features, one of ordinary skill may produce near net-shaped ceramic-matrix composites (e.g., for rocket or jet engine components), in accordance with desired enhanced performance.

The feasibility of fabricating shaped ceramic composites by the DCP process may be demonstrated by the syntheses of MgO/Mg—Al composites from porous Al$_2$O$_3$ preforms, as per the following reaction:

where (Al) refers to aluminum dissolved in a magnesium-rich melt. Three moles of MgO possess a volume that is 32% greater than one mole of Al$_2$O$_3$, so that this reaction is of the type (2), with A=3, B=2, C=3, M=Mg, N=Al, and X=O. Disk-shaped Al$_2$O$_3$ preforms (10 mm dia., 2 mm thick) with 29% porosity were prepared by pressing and partial sintering (for 8 h at 1500° C.) of Al$_2$O$_3$ powder. The disks were sealed within a steel can along with solid pieces of magnesium. The sealed can was then placed in a reaction furnace at 1000° C. for 15 h. Under these conditions, the magnesium melted, infiltrated, and reacted with the porous alumina preforms to yield 98% dense composites of 89.7 vol % MgO and 10.3 vol % Mg—Al alloy. The composites retained the shape and dimensions (to within 2.3%) of the porous alumina preforms. Hence, the porosity within the alumina preform was substantially compensated by the reaction-induced increase in solid volume.

The DCP method of the present invention has been used to produce near net-shaped MgO and MgAl$_2$O$_4$-bearing composites reinforced with lightweight Mg—Al or higher-melting (and stronger) Fe—Ni—Al alloys. Composites reinforced with the latter alloys possessed fracture strength and toughness values up to 470 MPa and 13 MP·am$^{1/2}$, respectively.

Several process modifications can be introduced to the basic process discussed above to produce reinforced ceramic composites:

1). Instead of starting with a pure elemental reactant M(l) in reaction (2), an alloy liquid containing species M can be used. The other elements in the starting liquid alloy may be inert (and thereby wind up as additional metallic phases in the final part), may react with the ceramic preform (to yield other oxidized phases), or may alloy with or react with the species N liberated by reaction (2) (to yield a compound containing N). For example, if Mg is alloyed with Ni, then reaction (3) may be modified as follows:

where (MgNi$_{2/3}$) refers to a molten Mg—Ni alloy, and NiAl(s) is an intermetallic compound.

2). By limiting the amount of one of the reactants, reaction (2) may also not be allowed to go to completion. This would allow for the formation of a wider range of ceramic compositions in the final part. For example, if the ratio of magnesium to alumina in reaction (3) were reduced from 3:1 to 3:4, then the following reaction can occur:

(Note: 3 moles of spinel, MgAl$_2$O$_4$, possess a larger volume than 4 moles of Al$_2$O$_3$, so that this reaction is still of the type (2).)

3). A gaseous reactant species (M in reaction (2)) could be used instead of a liquid species. For example:

4). Additional phases may be added to the porous preform. Such phases may act as reinforcements in the final component. For example, SiC could be added to an alumina preform to produce MgO/SiC/(Al) composites via reaction (3).

It is important to note that, although reactions (3)–(6) involve the consumption and formation of oxide materials or compounds, the DCP process also may be applied to the fabrication of other ionic materials or compounds (e.g., nitrides, sulfides, etc.). The DCP process refers to the use of an in-situ displacement reaction involving an increase in solid volume to produce a ceramic-bearing body with a lower pore fraction than the starting preform (i.e., due to compensation of at least some of the porosity in a porous preform by the displacement reaction).

DETAILED DESCRIPTION OF THE PREFERRED EMBODIMENTS

Figure 1:
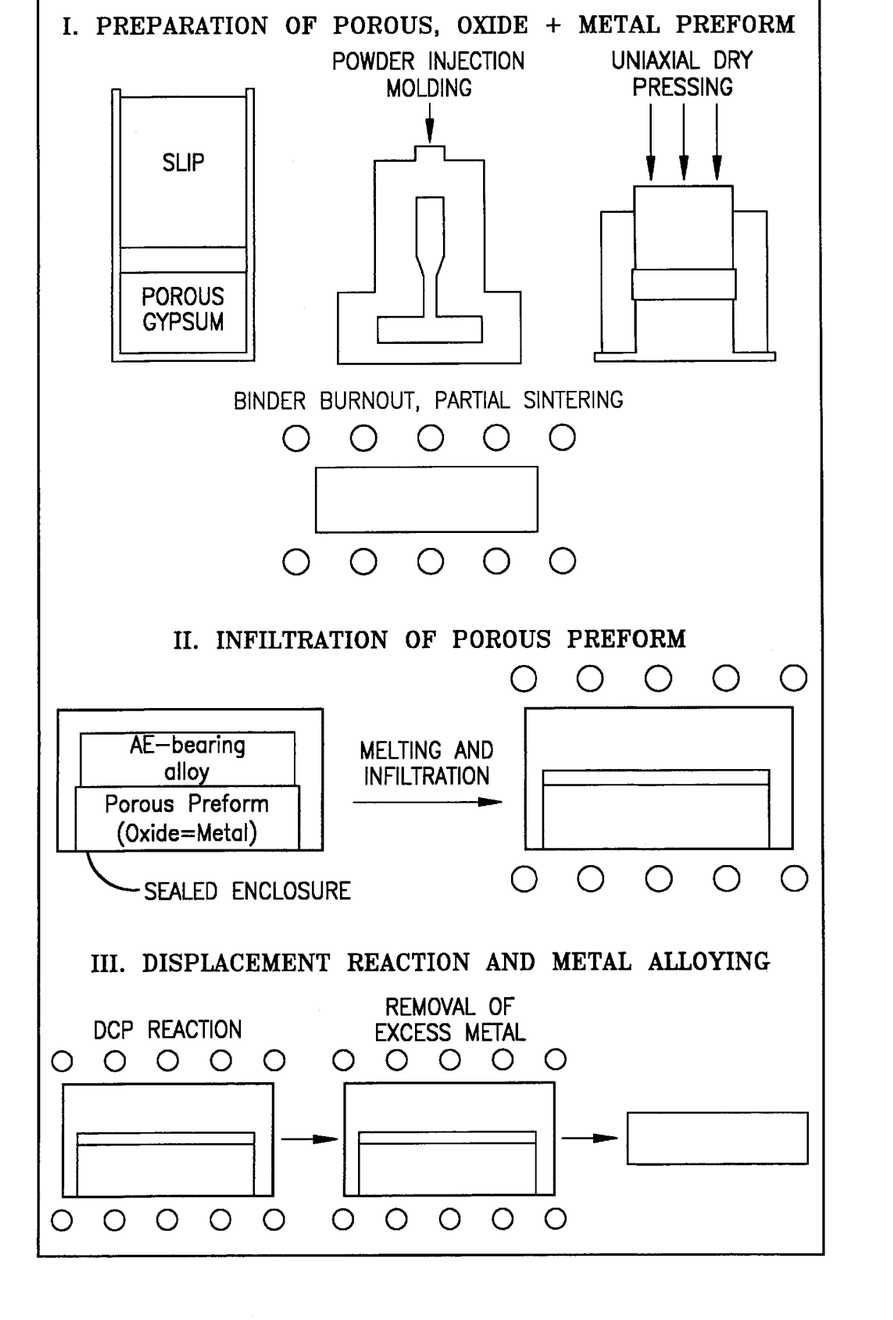
The FIGURE is a schematic of one embodiment of the DCP method of the present invention.

In accordance with the foregoing summary of the invention, the following presents a detailed description of the preferred embodiment of the invention which is presently considered to be its best mode.

The embodiment of the DCP method described herein includes a processing route comprising the following general steps (see the FIGURE below) [27]:

1) Fabrication of a shaped, porous, rigid preform containing oxide and metallic or intermetallic reactants (or otherwise obtaining such a preform);
2) Pressureless infiltration of the porous preform with an AE-bearing liquid; and
3) Heat treatment to allow for an internal displacement reaction between the AE-bearing liquid and a component in the solid oxide.

(Note: steps 2) and 3) can be conducted with the same heat treatment; that is, infiltration and reaction preferably may be conducted simultaneously.)

By tailoring the phase content and porosity of the preform, and the composition and amount of liquid used, the DCP process can be tuned to yield a near net-shaped, dense composite containing particular amounts of $AEAl_2O_4$ and M—Al alloy phases of desired composition. The porous preform can be produced in a desired shape by conventional ceramics forming operations such as: slip casting, powder injection molding, extrusion, tape casting, pressing, or tape calendering. The resulting green body can then be annealed to burnout organic binder material and to allow for neck formation between the solid particles (initial stage sintering), so as to obtain a rigid, yet porous, preform for subsequent infiltration. AE-bearing liquids are compatible with infiltration processing, in that such liquids melt at relatively low temperatures (see Table I below). AE elements also possess very high affinities for oxygen (i.e., higher even than aluminum, see Table II below), and tend to wet solid oxides, which allows for pressureless infiltration into porous oxide preforms (e.g., pressureless Mg(l) infiltration into porous preforms containing $NiAl_2O_4$ or $Al_2O_3(s)$ has been demonstrated). Such high oxygen affinities also provide a strong driving force for the DCP displacement reactions.

As an example of the process of the present invention and composite produced thereby, the following net displacement reaction between the magnesium in a liquid Mg—Al solution and the nickel oxide in solid $NiAl_2O_4$:

$$\{Mg\}+\{Al\}+NiAl_2O_4(s) \rightarrow MgAl_2O_4(s)+NiAl(s) \quad (I)$$

where the bracketing "{ }" refers to a species dissolved in a liquid phase.

Largely due to the high affinity of magnesium for oxygen, this reaction is strongly favored at 1000° C. The Gibbs free energy change per mole of this reaction, ΔG, at 1000° C. is −451.8 kJ/mole. In this DCP reaction, the amount of magnesium present in the liquid can be set equal to the amount of nickel in the $NiAl_2O_4(s)$ within the preform, so that: i) only the nickel oxide (not the alumina) in $NiAl_2O_4$ is reduced, and ii) essentially no residual metallic magnesium is retained in the transformed body. The nickel oxide in $NiAl_2O_4(s)$ is considerably easier to reduce than the alumina in this compound, as indicated by comparing the magnitudes of the standard Gibbs free energy changes, ΔG°, for the following reactions:

$$Mg(l)+NiAl_2O_4(s) \rightarrow MgAl_2O_4(s)+Ni(s) \quad (2a)$$

$$\Delta G°(1000° C.)=-349.68 \text{ kJ/mole}$$

$$Mg(l)+NiAl_2O_4(s) \rightarrow 1/3MgO(s)+2/3\ MgAl_2O_4(s)+2/3Al(l)+NiO(s) \quad (2b)$$

$$\Delta G°(1000° C.)=-43.14 \text{ kJ/mole}$$

Hence, by keeping the molar $AE:NiAl_2O_4$ ratio $\leq 1:1$, the nickel in $NiAl_2O_4(s)$ should be selectively reduced by the AE metal. Such selective reduction during the DCP process has been demonstrated. Other authors have also shown that the Mg metal within Mg—Al alloys can be selectively oxidized by displacement reactions with oxides that are less stable than MgO or $Al_2O_3$. Further, from the thermodynamic data in references, reaction (1) should proceed to the right at 1000° C. as long as the Mg concentration in the Mg—Al melt exceeds $3.3 \times 10^{-17}$ atom percent. That is, a negligible amount of magnesium should be retained in the melt, if the Mg: $NiAl_2O_4$ ratio is maintained at $\leq 1:1$. The latter prediction has been confirmed.

In the DCP process, displacement reactions are chosen that lead to an increase in solid volume (i.e., $V_m$(solid products)>$V_m$(solid reactants)). This volume increase is associated with the conversion of the components in the low-melting AE-bearing liquid into solid oxide and metallic (or intermetallic) phases. As a result, the pore volume within the shaped preform can be filled with the solid reaction products, so that a dense body is produced. The molar volumes of stoichiometric $NiA_2O_4(s)$, $MgAl_2O_4(s)$, and NiAl(s) are 39.25, 39.76, and 14.51 cm³/mole, respectively, so that the difference in volume between the solid products and reactants of reaction (1) is:

$$\Delta V_{rxn(l)}=V_f-V_o=(39.76+14.51)-39.25=15.02 \text{ cm}^3/\text{mole}$$

Hence, the relative volume change is:

$$100\Delta V/V_o=100(15.02)/39.25=38.3\%$$

That is, a 38.3% increase in solid, internal volume occurs as a result of reaction (1). This volume increase is due to the displacement reaction between magnesium and nickel oxide (in $NiAl_2O_4$) and to the reaction of aluminum with the displaced nickel to yield NiAl(s). The net result of reaction (1) is that the magnesium and aluminum in the low-melting liquid are converted into higher-melting (solid) phases; that is, the DCP process involves a reaction-induced solidification. Since the reaction occurs at liquid/solid interfaces (as opposed to only at contacts between solid particles, such as for the case of a solid/solid reaction in a porous preform), and since the liquid occupies the prior pore volume, this volume increase will lead to a filling of the prior pore spaces; that is, a reaction-induced densification will occur. If the reaction-induced increase in solid volume is greater than or equal to the pore volume in the starting preform, then a high-density body can be fabricated. Hence, for the present example, if the porosity within the porous $NiAl_2O_4$(s) preform is equal to:

$$P=[100(15.02)]/[15.02+39.25]=27.7\%$$

then reaction (1) should lead to a dense composite comprised of 73.3 vol % $MgAl_2O_4$ and 26.7 vol % NiAl. For higher density preforms, some residual, unreacted $NiAl_2O_4$ (or an $(Mg,Ni)Al_2O_4$ solid solution) will be retained within the specimen.

A more general form of reaction (1) can be written as follows:

(3)

where the bracketing "{ }" refers to a species dissolved in a liquid, AE refers to Mg, Ca, or Ba, and $Ni_yAl_z$(s) or $Ni_{1+x+y}Al_{w+z}$ refer to a (Ni,Al) solid solution, an intermetallic compound (e.g., $Ni_3Al$), or a mixture of both. (A similar type of reaction can be written for the syntheses of $AEAl_2O_4$/Nb or $AEAl_2O_4$/Nb—Al alloy composites, where $NbAlO_4$ or other niobium aluminates are used as solid reactants.) In this case, unlike for reaction (1), some of the nickel and aluminum required for the $Ni_{1+x+y}Al_{w+z}$(s) phase in the final composite are present within a solid $Ni_yAl_z$ phase in the preform. By tailoring the preform porosity, the liquid composition (i.e., w and x values), and the preform metal content (i.e., y and z values), dense, shaped composites consisting of a wide range of ceramic, and metal or intermetallic phases can be fabricated. For example, if AE=Ba, w=0.06, x=y=z=0, and the pore fraction of the preform is 0.433, then completion of the displacement reaction at 1000° C. should yield a dense composite comprised of 90.5 vol % $BaAl_2O_4$ and 9.5 vol % $Ni_{0.94}Al_{0.06}$ solid solution. However, if AE=Ba, w=2, x=0, y=5, z=0, and the pore fraction of the preform is 0.386, then a dense composite comprised of 53.3 vol % $BaAl_2O_4$ and 46.7 vol % $Ni_3Al$ should be produced. Values of w, x, y, and z leading to a variety of composites are shown in Table III below. By varying w, x, y, and z in a similar manner, $MgAl_2O_4$-bearing or $BaAl_2O_4$-bearing composites containing a range of ceramic, metallic and/or intermetallic phases could also be produced.

The feasibility of using reactive infiltration processes to produce dense ceramic/metal composites (e.g., $Al_2O_3$/Al—Si, $MgO/MgAl_2O_4$/Fe—Ni—Al) with flexural strengths and toughness values of 300–500 MPa and 8–13 MPa·m$^{1/2}$ has been demonstrated.

In accordance with the present invention, it is anticipated that the phase sizes in the final composites, for a given preform phase content, can be adjusted by varying the sizes of the oxide and metal phases (and, hence, pore sizes) in the preform and, further, that such adjustment will lead to optimum values of strength and toughness. The strength and ductility of the reinforcement phase are also important parameters.

$Ni_3Al$ may act as a ductile reinforcement at both room temperature and elevated temperatures in $Al_2O_3$-bearing (or $AEAl_2O_4$-bearing) composites, provided that: i) the $Ni_3Al$ filament size in the composites is smaller than the $Ni_3Al$ crystal size (i.e., so as to minimize the number of grain boundaries within the $Ni_3Al$ filaments) and/or ii) the $Ni_3Al$ phase is of proper stoichiometry and is properly alloyed (e.g., Al concentration <25 at % with boron doping). By introducing dopants to the $Ni_yAl_z$(s) phase (e.g., boron, chromium) in the preform, composites reinforced ductile $Ni_3Al$ may also be produced. Such doping may also be used to produce composites reinforced with Ni—Cr—Al—Y-based superalloys. Similar approaches may be used to fabricate $AEAl_2O_4$ composites reinforced with Nb—Al alloys of controlled chemistry. Hence, $AEAl_2O_4$-bearing composites reinforced with Ni-bearing or Nb-bearing alloys comprising a range of phase contents and phase compositions may be fabricated by the DCP method. Such flexibility in tailoring the phase content, phase size/distribution, and phase chemistry, without compromising the shape retention capability, is a unique feature of the DCP process.

Advantages Relative to Other Ceramic Processing Routes

The fabrication of $AEAl_2O_4$/Ni—Al alloy or $AEAl_2O_4$/Nb—Al alloy composites in accordance with one embodiment of the present invention is believed to be novel.

The closest related work is the processing of $Al_2O_3$/Ni—Al alloy composites. A variety of synthesis methods have been used to produce $Al_2O_3$ composites reinforced with Ni (or a Ni solid solution), $Ni_3A$, or NiAl, including:

hot pressing of mixtures of oxide+metal or intermetallic, where the mixtures were prepared by milling or by sol-gel processing, gas-pressure infiltration of Ni—Al liquid into porous $Al_2O_3$ preforms, selective reduction of $NiO+Al_2O_3$ mixtures or of $NiAl_2O_4$ in a reducing atmosphere [33,43–45,62], solid-state displacement reactions between NiO and NiAl [46], and displacement reactions between NiO(s) and Al(l).

The DCP method of the present invention differs from each of these methods and, for the following reasons, is a more attractive process:

1) Hot pressing and gas-pressure infiltration are not required to produce dense composites with the DCP process of the present invention. Indeed, hot pressing is not a viable method for fabricating ceramic bodies of complex shape (i.e., non-axial-symmetric geometries) and is a relatively expensive batch process (as is hot isostatic pressing). Gas pressure infiltration of Ni—Al liquids is also a relatively expensive batch process that requires the use of a specially-designed system to allow for the infiltration of such high-melting Ni—Al liquids ($T_m \geq 1360°$ C. for $Ni_3Al$ and $\geq 1385°$ C. NiAl).

2) The selective reduction of nickel oxide (as NiO or $NiAl_2O_4$) in a reducing atmosphere results in significant volume decrease that, in turn, leads to a loss of the original specimen dimensions upon sintering to a high density. Unlike the DCP method, the gaseous reduction process does not lead to near net-shaped composites. Furthermore, oxygen diffusion through a thick, dense NiO or $NiAl_2O_4$ precursor body would require the use of relatively high temperatures or long reduction times (e.g., anneals at 1600–1700° C. were used to reduce 5 mm thick specimens in reference). The reduction of a porous NiO or $NiAl_2O_4$ precursor body (i.e., to allow for an enhanced rate of oxygen removal) would result in a further shrinkage upon subsequent sintering to a high density. Finally, the selective reduction of $NiAl_2O_4$ to yield $Al_2O_3$ composites reinforced with Ni—Al alloys (e.g., $Ni_3Al$ or NiAl), as opposed to essentially pure Ni, would require the use of very low and controlled oxygen partial pressures (e.g., $p_{O_2} \leq 6.0 \times 10^{-29}$ atm at 1000° C.), which would be relatively difficult to scale up in a continuous fashion for manufacturing.

3) Solid-state displacement reactions between NiO and Ni—Al alloys result in appreciable volume changes. For example, the reaction-induced volume change for the following reaction:

$$4.5\ NiAl(s) + 3NiO(s) \rightarrow 2.5\ Ni_3Al(s) + Al_2O_3(s) \quad (4)$$

is +44.3%. Since this reaction is initiated at contact points between NiAl and NiO particles, continued reaction will cause the separation distance between the particles to increase and, hence, a significant expansion of the body must occur. Such expansion could be reduced by reactive hot pressing, but the limitations of cost and specimen shape would again apply.

4) Prior work on displacement reactions between NiO(s) and Al(l) have been conducted by pressing mixtures of NiO and Al powders, and then annealing the pressed bodies well above the melting point of Al, with or without the application of an external pressure (reactive hot pressing). Appreciable shrinkages have been reported for displacement reaction processing conducted in this fashion [62, 66,69]. Such shrinkages result from:

i) the difference in porosity of the starting, as-pressed precursor (Al-oxide mixtures with the necessary oxide contents are difficult to press to a high relative density) and the final, dense product, and ii) the reaction-induced volume change.

In the DCP method of the present invention, an AE-bearing liquid preferably and most economically is infiltrated without the application of an external pressure into a porous oxide preform. AE-bearing liquids readily wet and infiltrate porous oxide preforms, even for oxides such as $Al_2O_3$ that tend not to be wet by Al(l), Ni(l), or most metallic liquids. Such pressureless infiltration is more amenable for scale up in manufacturing than gas-pressure-assisted infiltration. Unlike the methods discussed above, the DCP process may produce near net-shaped, dense composites at modest firing temperatures (e.g., at 900° C.). The ability to retain the dimensions of the porous preform allows for the fabrication of complicated shapes, since porous preforms of complicated shape can be readily produced by conventional ceramic processing (slip casting, injection molding, etc.). The DCP approach is also well suited for the fabrication of relatively large components, since the effective diffusion distance required for the transformation reaction is dependent on the internal phase sizes and not on the external component dimensions (i.e., the transport of gaseous oxygen over long distances is not required, as is the case for gas-phase reduction processing).

In short, the DCP method of the present invention is a relatively simple, low-cost, scaleable method for fabricating dense, high-temperature AE-oxide/metal alloy composites of complicated and near-net shape.

Industrial Applicability

The displacement-reaction-based process of the present invention may be used, for example in synthesizing near net-shaped, ceramic/metal alloy composites for high-temperature applications (e.g., static components in rocket or jet engines). Hence, DCP-derived $AEAl_2O_4$/M—Al alloy composites may be used in liquid-fueled rocket engines (e.g., high-melting $MgAl_2O_4$/Nb composites for nozzle liners) or in jet engines (e.g., oxidation-resistant $BaAl_2O_4$/$Ni_3Al$+NiAl composites for shrouds, vanes).

DCP-derived $AEAl_2O_4$/Ni—Al alloy composites of the present invention typically would be expected to exhibit comparable or better oxidation resistance and mechanical properties to that of monolithic $Si_3N_4$ prepared by conventional sintering or reaction bonding. Tuan and Brooks have shown that the oxidation resistance of $Al_2O_3$/Ni composites at 1300° C. in air is similar to that for high-purity RBSN. Since the oxidation kinetics of Ni—Al alloys can be several orders of magnitude slower than that for pure Ni at 1300° C., the oxidation resistance of $AEAl_2O_4$/Ni—Al alloy composites should be much better than for $Al_2O_3$/Ni composites. Typical values of flexural strength and toughness reported for sintered or reaction-bonded silicon nitride (RBSN) at room temperature are 200–600 MPa and 2–5 MPa·m$^{1/2}$, respectively. Higher toughnesses with comparable fracture strengths have been achieved with displacement $Al_2O_3$/Al—Si and MgO/$MgAl_2O_4$/Fe—Ni—Al composites prepared in accordance with the present invention. With further modification of the melt and preform chemistry (e.g., the addition of metallic nickel to the preform or the melt, the addition of niobium as metallic Nb or as $NbAlO_4$ to the preform), the DCP method of the present invention is thus capable of yielding composites that are more oxidation resistant or higher melting (e.g., oxidation-resistant $BaAl_2O_4$/$Ni_3Al$+ NiAl alloy composites or high-melting $MgAl_2O_4$/Nb composites). Higher bend strength and toughness may also be achieved with such $AEAl_2O_4$/M—Al composites, by correlating microstructural/microchemical features and mechanical behavior.

Certain microstructural features (e.g., the interconnectivity, size, strength, and ductility of the reinforcement phase, along with interface chemistry) of such $Al_2O_3$/Ni—Al alloy composites can strongly influence the strength and toughness of ceramic/metal (or intermetallic) composites. Further, because dense, near net-shaped $AEAl_2O_4$/Ni—Al alloy components can be fabricated with the DCP process of the present invention (unlike conventionally-prepared $Al_2O_3$/Ni—Al alloy composites) without the use of costly hot pressing, such DCP-derived composites are attractive alternatives to components based on monolithic $Si_3N_4$.

With respect to other DCP-derived $MgAl_2O_4$/Nb (or Nb—Al alloy) composites, these may be attractive materials for high temperature applications, such as combustor or nozzle linings in liquid-fueled rocket engines. The melting points of stoichiometric $MgAl_2O_4$, Nb, and stoichiometric $Nb_3Al$ are 2105° C., 2468° C., and 2060° C., respectively. The melting point of $MgAl_2O_4$ may be further raised by substituting some or all of the aluminum with chromium (i.e., the melting point of $MgCr_2O_4$ is ~2400° C. Furthermore, as spinel possesses less than half the density of niobium, and since niobium is one of the lighter refractory metals (i.e., compared to W, Ta, and Mo), high-melting composites of spinel and niobium should be relatively light. For example, a composite comprised of an equimolar mixture of $MgAl_2O_4$ and Nb has an overall specific density similar to that of titanium. $MgAl_2O_4$/Nb composites also exhibit attractive thermal properties. The average, linear CTE values of polycrystalline $MgAl_2O_4$, $MgCr_2O_4$, Nb, and $Nb_3Al$ are similar (i.e., within the range of 7.2–9.2×10$^{-6}$/°C.), so that composites of these materials should be relatively resistant to damage from repeated thermal cycling. Even more important is the high thermal conductivity exhibited by polycrystalline niobium at elevated temperatures (e.g., □68 W/mK at 1000° C. and □82 W/mK at 2000° C. At 1000–2000° C.), Nb possesses a thermal conductivity that is greater than or equal to refractory carbides (e.g., SiC, $B_4C$, HfC, TaC) and several grades of polycrystalline graphite. Hence, cooling of co-continuous $MgAl_2O_4$/Nb composites can be an effective method of reducing the composite temperature in service (i.e., by cooling one side of a $MgAl_2O_4$/Nb nozzle liner, the temperature near the hot face may be significantly reduce) which, in turn, should enhance the erosion/corrosion resistance of such composites. These high-temperature properties, coupled with the capability for fabricating such composites in complex and near net-shapes by the DCP method, make DCP-derived, co-continuous $MgAl_2O_4$/Nb composites very attractive for high-temperature applications in liquid-fueled rockets.

In view of the present disclosure or through practice of the present invention, it will be within the ability of one of ordinary skill to make modifications to the present invention, such as through the use of equivalent process steps, process parameters and constituent compositions, in order to practice the invention without departing from the spirit of the invention as reflected in the appended claims which are hereby incorporated into this description.

TABLE I

Liquidus and eutectic temperatures for several binary AE-bearing compositions [9].

| AE Element | Amount (at %) Second Element | Liquidus Temperature | AE Element | Amount (at %) Second Element | Liquidus Temperature |
|---|---|---|---|---|---|
| Mg | None | 650° C. | Sr | None | 769° C. |
| Mg | 10 at % Al | 586° C. | Sr | 10 at % Al | 703° C. |
| Mg | 25 at % Al | 490° C. | Sr | 25 at % Al | 652° C. |
| Mg | 50 at % Al | 456° C. | Sr | 50 at % Al | 829° C. |
| Mg | 10 at % Ni | 527° C. | Sr | 10 at % Ni | 680° C. |
| Mg | 25 at % Ni | 732° C. | Sr | 25 at % Ni | 915° C. |
| Ca | None | 842° C. | Ba | None | 727° C. |
| Ca | 10 at % Al | 784° C. | Ba | 10 at % Al | 645° C. |
| Ca | 25 at % Al | 651° C. | Ba | 25 at % Al | 547° C. |
| Ca | 50 at % Al | 864° C. | Ba | 50 at % Al | 757° C. |
| Ca | 10 at % Ni | 704° C. | Ba | 10 at % Ni | 702° C. |
| Ca | 25 at % Ni | 727° C. | Ba | 25 at % Ni | 990° C. |

| Binary System | Eutectic Temperature* | Eutectic Liquid Composition* |
|---|---|---|
| Mg—Al | 437° C. | 31.0 at % Al |
| Mg—Ni | 506° C. | 11.3 at % Ni |
| Ca—Al | 545° C. | 35.0 at % Al |
| Ca—Ni | 605° C. | 16.0 at % Ni |
| Sr—Al | 590° C. | 18.3 at % Al |
| Sr—Ni | 660° C. | 11 at % Ni |
| Ba—Al | 528° C. | 28.0 at % Al |
| Ba—Ni | 660° C. | 6.0 at % Ni |

*For the most AE-rich eutectic point.

TABLE II

Oxygen partial pressures associated with metal/metal oxide equilibria [60].

| Element/Oxide | Temperature | Equilibrium Oxygen Partial Pressure |
|---|---|---|
| Mg/MgO | 1000° C. | $1.4 \times 10^{-38}$ atm |
| Ca/CaO | 1000° C. | $6.7 \times 10^{-42}$ atm |
| Sr/SrO | 1000° C. | $1.1 \times 10^{-38}$ atm |
| Ba/BaO | 1000° C. | $5.5 \times 10^{-36}$ atm |
| Ni/NiO | 1000° C. | $4.6 \times 10^{-11}$ atm |
| Nb/$Nb_2O_5$ | 1000° C. | $7.2 \times 10^{-23}$ atm |
| Si/$SiO_2$ | 1000° C. | $9.3 \times 10^{-29}$ atm |
| Al/$Al_2O_3$ | 1000° C. | $1.7 \times 10^{-35}$ atm |

TABLE III

Melt and preform composition parameters for the DCP process and the resulting $AEAl_2O_4$/Ni—Al Alloy composites (for AE = Ba).

| Melt/Perform Composition Parameters (as per reaction (3)) | | | | Critical Preform Porosity | Phase Content of Final Composite (vol %) | | | |
|---|---|---|---|---|---|---|---|---|
| w | x | y | z | (vol %) | $AEAl_2O_4$ | Ni or (Ni,Al) | $Ni_3Al$ | NiAl |
| 0 | 0 | 0 | 0 | 43.3 | 90.5 | 9.5 | — | — |
| 0.12 | 0 | 0 | 0 | 43.3 | 90.4 | 9.6 | — | — |
| 0 | 0.30 | 0 | 0 | 44.8 | 88.0 | 12.0 | — | — |
| 0 | 0.30 | 1.00 | 0 | 41.0 | 80.5 | 19.5 | — | — |
| 0 | 0.30 | 3.00 | 0.41 | 35.8 | 66.7 | 33.3 | — | — |
| 0.95 | 0 | 6.00 | 0 | 31.8 | 54.2 | 45.8 | — | — |
| 1.00 | 0 | 3.00 | 0 | 38.8 | 64.9 | 14.4 | 20.7 | — |
| 0.50 | 0 | 0.50 | 0 | 44.2 | 82.0 | — | 18.0 | — |
| 2.00 | 0 | 5.00 | 0 | 38.6 | 53.3 | — | 46.7 | — |
| 2.00 | 0 | 6.00 | 2.00 | 32.8 | 44.7 | — | 29.4 | 25.9 |
| 1.00 | 0 | 0 | 0 | 49.1 | 81.2 | — | — | 18.8 |
| 2.00 | 0 | 2.00 | 1.00 | 43.2 | 59.0 | — | — | 41.0 |
| 2.00 | 0 | 4.00 | 3.00 | 34.0 | 46.3 | — | — | 53.7 |
| 2.00 | 0 | 6.00 | S.00 | 28.0 | 38.1 | — | — | 61.9 |

What is claimed is:

1. A method for producing a material selected from the group consisting of ceramics and ceramic composites, said method comprising reacting:

(1) a fluid comprising at least one displacing metal; and (2) a rigid, porous ionic material having a pore volume and comprising at least one ion, said at least one displacing metal capable of displacing said at least one ion; and allowing said fluid to infiltrate said ionic material such that said at least one displacing metal at least partially replaces said at least one ion, and so as to at least partially fill said pore volume, and so as to produce a ceramic product material selected from the group consisting of ceramics and ceramic composites, said ceramic product material having a ceramic component having a volume greater than the volume of said ionic material from which said at least one ion is displaced.

2. A method according to claim 1 wherein said at least one displacing metal is selected from the group consisting of magnesium, calcium, strontium, barium and mixtures thereof.

3. A method according to claim 1 wherein said at least one ion is derived from a non-alkaline earth metal.

4. A method according to claim 3 wherein said non-alkaline earth metal is selected from the group consisting of aluminum, nickel, and niobium.

5. A method according to claim 1 wherein said ionic material comprises materials selected from the group consisting of oxides, sulfides, nitrides and halides.

6. A method according to claim 1 wherein said ionic material is selected from the group consisting of aluminates, aluminosilicates, silicates, titanates, zirconates, and niobates.

7. A method according to claim 1 wherein said at least one displacing metal substantially replaces said at least one ion.

8. A method according to claim 1 wherein said ionic material is preformed into a shape, and wherein said material is selected from the group consisting of ceramics and ceramic composites maintains said shape.

9. A method according to claim 1 wherein said fluid is a liquid, said liquid being supplied by a melting solid comprising said at least one displacing metal.

10. A method for producing a material selected from the group consisting of ceramics and ceramic composites, said method comprising reacting:

(1) a fluid comprising at least one displacing metal; and (2) a rigid, porous ionic material having a pore volume and comprising at least one ion, said at least one displacing metal capable of displacing said at least one ion; and allowing said fluid to infiltrate said rigid, porous ionic material such that said at least one displacing metal at least partially replaces said at least one ion, and so as to at least partially fill said pore volume and so as to undergo a general displacement reaction between reactants comprising a liquid species $M(l)$ derived from said fluid, and said rigid, porous ionic material of the general form $N_B X_C(s)$, as follows:

$$AM(l) + N_B X_C(s) = AMX_{C/A}(s) + BN(l/g)$$

wherein $MX_{C/A}(s)$ is a solid reaction product and wherein X is a metalloid element, $N(l/g)$ is a fluid reaction product, and A, B and C are molar coefficients; and wherein said reactants are chosen such that the volume of A moles of the said solid reaction product $MX_{C/A}(s)$ is greater than the volume of one mole of said solid reactant, $N_B X_C(s)$, such that the reaction-induced volume increase can be accommodated by such pore volume, and so as to produce a material selected from the group consisting of ceramics and ceramic composites.

11. A method according to claim 10 wherein said at least one displacing metal is selected from the group consisting of magnesium, calcium, strontium, barium and mixtures thereof.

12. A method according to claim 10 wherein said at least one ion is derived from a non-alkaline earth metal.

13. A method according to claim 12 wherein said non-alkaline earth metal is selected from the group consisting of aluminum, nickel, and niobium.

14. A method according to claim 12 wherein said at least one displacing metal substantially replaces said at least one ion derived frorm a non-alkaline earth metal.

15. A method according to claim 10 wherein said ionic material comprises materials selected from the group consisting of oxides, sulfides, nitrides and halides.

16. A method according to claim 10 wherein said ionic material is selected from the group consisting of aluminates, aluminosilicates, silicates, titanates, zirconates, and niobates.

17. A method according to claim 10 wherein said ionic material is preformed into a shape, and wherein said material is selcted from the group consisting of ceramics and ceramic composites maintains said shape.

18. A method according to claim 10 wherein said fluid is a liquid, said liquid being supplied by a melting solid comprising said at least one displacing metal.

19. A method for producing a ceramic composite, said method comprising the steps:

(a) placing in contact:
   (1) a solid constructed and arranged to produce a fluid material comprising at least one displacing metal;
   (2) a rigid, porous ionic material having a pore volume and comprising at least one ion; and (b) maintaining said solid at sufficient temperature such that said solid produces said fluid, said fluid infiltrating said ionic material so as to at least partially replace said at least one ion, and so as to at least partially fill said pore volume, and so as to produce a ceramic product material selected from the group consisting of ceramics and ceramic composites, said ceramic product material having a ceramic component having a volume greater than the volume of said ionic material from which said at least one ion is displaced.

20. A method according to claim 19 wherein said at least one displacing metal is selected from the group consisting of magnesium, calcium, strontium, barium and mixtures thereof.

21. A method according to claim 19 wherein said at least one ion is derived from a non-alkaline earth metal.

22. A method according to claim 21 Wherein said non-alkaline earth metal is selected from the group consisting of aluminum, nickel, and niobium.

23. A method according to claim 19 wherein said ionic material is selected from the group consisting of aluminates, aluminosilicates, silicates, titanates, zirconates, and niobates.

24. A method according to claim 19 wherein said at least one displacing metal substantially replaces said at least one ion.

25. A method according to claim 19 wherein said ionic material is preformed into a shape, and wherein said ceramic product material selected maintains said shape.

26. A method according to claim 19 wherein said fluid is a liquid, said liquid being supplied by melting a solid comprising said at least one displacing metal.

* * * * *